US012228378B2

(12) United States Patent
Lettow et al.

(10) Patent No.: US 12,228,378 B2
(45) Date of Patent: Feb. 18, 2025

(54) WEARABLE COMMUNICATIONS AND BALLISTIC PROTECTION SYSTEM

(71) Applicant: Vorbeck Materials Corp., Jessup, MD (US)

(72) Inventors: John Lettow, Washington, DC (US); Keren Espina, Randallstown, MD (US); Jennifer Pinkos, Hanover, MD (US); James A Turney, Silver Spring, MD (US); Can Gun Yaprak, Halethorpe, MD (US); Sandy Spence, Westminster, MD (US)

( * ) Notice: Subject to any disclaimer, the term of this patent is extended or adjusted under 35 U.S.C. 154(b) by 141 days.

(21) Appl. No.: 17/713,052

(22) Filed: Apr. 4, 2022

(65) Prior Publication Data

US 2024/0167791 A1 May 23, 2024

(51) Int. Cl.
*F41H 1/02* (2006.01)
*H01Q 1/27* (2006.01)

(52) U.S. Cl.
CPC ............... *F41H 1/02* (2013.01); *H01Q 1/273* (2013.01)

(58) Field of Classification Search
CPC .............. F41H 1/02; F41H 5/08; H01Q 1/273
USPC ................... 2/2.5, 462, 463; 89/26.04, 36.05
See application file for complete search history.

(56) References Cited

U.S. PATENT DOCUMENTS 5,802,607 A * 9/1998 Triplette .............. D03D 15/283 139/426 R
5,906,004 A * 5/1999 Lebby .................. D03D 15/242 2/905
7,002,526 B1 * 2/2006 Adams ................... H01Q 1/273 343/729
7,658,901 B2 2/2010 Prud'Homme et al.
8,278,757 B2 10/2012 Crain et al.
10,601,104 B2 3/2020 Manivannan et al.
11,754,375 B1 * 9/2023 Zalar ..................... H01M 50/24 89/36.02
2010/0083428 A1 * 4/2010 McElroy ................... F41H 1/02 2/456

(Continued)

FOREIGN PATENT DOCUMENTS

GB 2415602 A * 1/2006 ............... F41H 1/02
WO WO-2015049483 A1 * 4/2015 ............... F41H 1/02
WO WO-2022256344 A1 * 12/2022 ............ F41C 33/029

*Primary Examiner* — Tajash D Patel
(74) *Attorney, Agent, or Firm* — Trent V. Bolar, Esq.; Woods Oviatt Gilman LLP

(57) ABSTRACT

The instant disclosure seeks to a wearable communications and ballistics protection system that includes a carrier, communications hub, and antenna element(s). The hub is affixed to the carrier and includes an antenna port(s). The antenna element(s) is affixed to the carrier. Each antenna port conductively couples to an antenna element as well as demountably and conductively couples to a portable radio. The carrier holds ballistic plates and is configured to be worn on the user's torso and provide ballistic protection thereto. Antenna elements are formed using a graphene-polymer conductive composition. The carrier includes first and second panels that hold ballistic plates and are pivotably coupled together at a top end. The first and second panels are also laterally held together via demountable fasteners. The antenna elements and/or the panels include EM shielding material to shield the user from EM that emanates from antenna elements.

20 Claims, 6 Drawing Sheets

(56) References Cited

U.S. PATENT DOCUMENTS

| | | | | |
|---|---|---|---|---|
| 2013/0265161 | A1* | 10/2013 | Brinkley | F41H 1/02 340/540 |
| 2019/0133303 | A1* | 5/2019 | Thiel | H02J 7/34 |
| 2020/0395970 | A1* | 12/2020 | Manivannan | A41D 1/002 |
| 2023/0292913 | A1* | 9/2023 | Pinkos | H01Q 1/526 224/576 |

* cited by examiner

WEARABLE COMMUNICATIONS AND BALLISTIC PROTECTION SYSTEM

STATEMENT REGARDING FEDERALLY SPONSORED RESEARCH OR DEVELOPMENT

This invention was made with government support under a project level agreement with the Air Force Research Laboratory, Number Project Announcement No. RIK-OTA-20-GWA. The U.S. Government has certain rights in this invention.

BACKGROUND

The instant disclosure relates generally to communications systems and specifically to wearable communications and ballistic protection system. A ballistic vest or bullet-resistant vest, often called a ballistic plate carrier, is an item of body armor that helps absorb the impact and reduce or stop penetration to the torso from high speed projectiles and shrapnel. This armor may come in a soft form or hard. Like the name says, plate carriers are intended to be worn with armor plates permanently or demountably positioned within the compartments.

Hand-held (i.e. portable) communications systems, such as walkie-talkies and other portable radio transceivers, are used by military personnel, law enforcement officials, first responders, as well as civilians. However, such systems typically utilize one or more conspicuous antennas, such as whip antennas, which typically consist of a straight flexible metal wire or rod embedded in polymer material. The bottom end of whip antennas are communicatively coupled to the transceiver of the handheld communications system. Whip antennas are typically designed to be flexible to reduce breaking. However, such antennas are increasingly deployed in environments where identification of the communications personnel and/or their locations may not be desired (e.g., military theaters and clandestine operations). Even more, such antennas are typically vulnerable to entanglement in foliage or debris, and damage in disaster and emergency, as well as high population density environments. Therefore, a ballistic protection system that assists in communications would be beneficial to consumers.

DETAILED DESCRIPTION

Figure 1A:
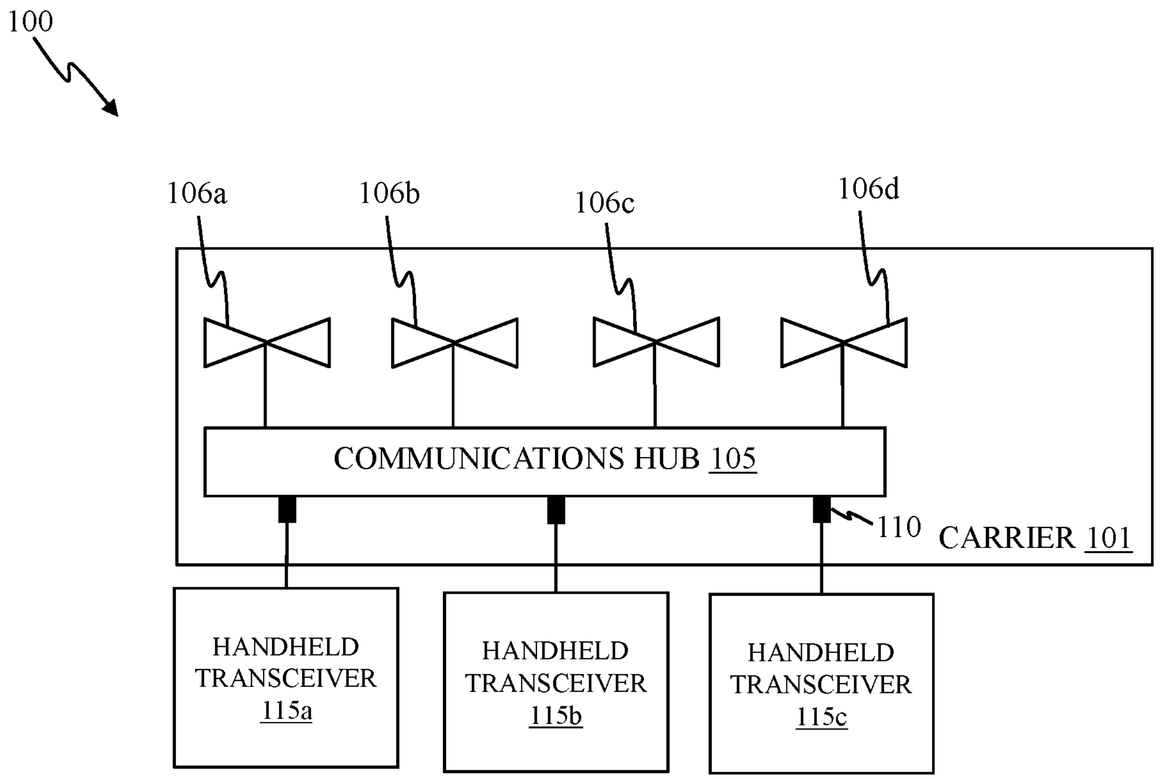
FIG. 1*a* depicts a block diagram of a wearable communications ballistic protection system, in accordance with some embodiments.
Figure 1B:
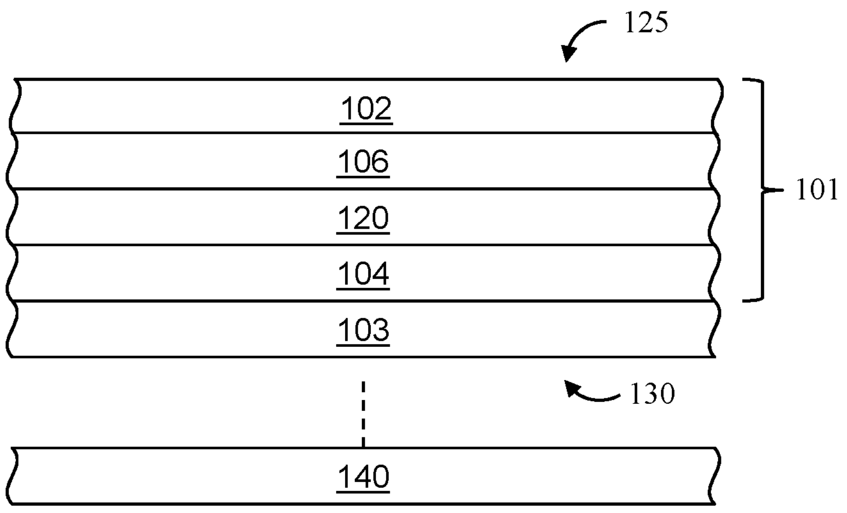
FIG. 1*b* depicts a side cut through view of portion of a ballistic plate carrier that includes an EM shielding material positioned between an antenna element and a user surface, in accordance with other embodiments.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Certain terminology may be employed in the following description for convenience rather than for any limiting purpose. For example, the terms "forward" and "rearward," "front" and "rear," "right" and "left," "upper" and "lower," and "top" and "bottom" designate directions in the drawings to which reference is made, with the terms "inward," "inner," "interior," or "inboard" and "outward," "outer," "exterior," or "outboard" referring, respectively, to directions toward and away from the center of the referenced element, the terms "radial" or "horizontal" and "axial" or "vertical" referring, respectively, to directions or planes which are perpendicular, in the case of radial or horizontal, or parallel, in the case of axial or vertical, to the longitudinal central axis of the referenced element, and the terms "downstream" and "upstream" referring, respectively, to directions in and opposite that of fluid flow. Terminology of similar import other than the words specifically mentioned above likewise is to be considered as being used for purposes of convenience rather than in any limiting sense.

In the FIGURES, elements having an alphanumeric designation may be referenced herein collectively or in the alternative, as will be apparent from context, by the numeric portion of the designation only. Further, the constituent parts of various elements in the FIGURES may be designated with separate reference numerals which shall be understood to refer to that constituent part of the element and not the element as a whole. General references, along with references to spaces, surfaces, dimensions, and extents, may be designated with arrows. Angles may be designated as "included" as measured relative to surfaces or axes of an element and as defining a space bounded internally within such element therebetween, or otherwise without such designation as being measured relative to surfaces or axes of an element and as defining a space bounded externally by or outside of such element therebetween.

Generally, the measures of the angles stated are as determined relative to a common axis, which axis may be transposed in the FIGURES for purposes of convenience in projecting the vertex of an angle defined between the axis and a surface which otherwise does not extend to the axis. The term "axis" may refer to a line or to a transverse plane through such line as will be apparent from context.

The instant disclosure seek to provide wearable communications and ballistics protection systems having antenna elements that provide a reduced visual signature. The instant disclosure seeks to provide antenna elements that are flexible and foldable and can substantially conform to the contours of the user without a statistically significant (e.g., greater than 0.5 dB) loss in performance.

Hand-held (i.e. portable) communications systems, such as walkie-talkies and other portable radio transceivers (i.e. handheld transceivers), are typically used by military personnel, law enforcement officials, first responders, as well as civilians. However, such systems typically utilize one or more conspicuous antennas, such as whip antennas, which typically consist of a straight flexible metal wire or rod. The bottom end of whip antennas are communicatively coupled to the transceiver. Whip antennas are typically designed to be flexible to reduce breaking since such antennas are typically vulnerable to entanglement in foliage or debris, and damage in disaster and emergency, as well as high population density environments. However, such antennas are increasingly deployed in environments where identification of the communications personnel and/or their locations may not be desired (e.g., military theaters and clandestine operations).

A ballistic vest or bullet-resistant vest, often called a ballistic plate carrier, is an item of body armor that helps absorb the impact and reduce or stop penetration to the torso from high speed projectiles and shrapnel. This armor may come in a soft form or hard. Like the name says, plate carriers are intended to be worn with armor plates permanently or demountably positioned within the compartments.

FIG. 1*a* depicts a block diagram of a wearable communications and ballistics protection system (WCBPS) 100, in accordance with some embodiments. The WCBPS 100 includes a carrier 101, a communications hub 105, and antenna elements 106 conductively coupled thereto. The carrier 101 is configured to be worn on the torso of a user and provide ballistic protection thereto. To provide such protection, the carrier 101 demountably receives at least one ballistic plate (hard or soft). The antenna element 106 can include an antenna array. Although depicted as having four (4) antenna elements 106 (i.e., antenna elements 106*a*, 106*b*, 106*c*, and 106*d*), the WCBPS 100 can include any number of antenna elements 106 to satisfy one or more embodiments of the instant disclosure (i.e. at least one antenna element 106). At least one of the antenna elements 106*a*, 106*b*, 106*c*, and 106*d* preferably operates on a RF frequency that is unique compared to others of the aforementioned group.

In other words, the antenna elements 106*a*, 106*b*, 106*c*, and 106*d* preferably each operate on a different frequency. A person of ordinary skill in the art would recognize that an antennas operational frequency influences the size thereof; hence the size of the antenna elements 106 can uniform or variable. The communications hub 105 is affixed to the carrier 101 and includes one or more antenna ports 110 that each demountably couples to a handheld transceiver 115 (e.g., a handheld transceiver 115*a*, 115*b*, or 115*c*) at one end and conductively couples to one of the antenna elements 106 or antenna attachment site 130 at the opposite end. To be sure, the communications hub 105 can include any number of the antenna ports 110 to satisfy one or more embodiments of the instant disclosure.

The communications hub 105 is the central location where handheld transceivers 115 or other similar communications devices conductively and demountably couple to the antenna elements 106. In other words, the communications hub 105 acts as a RF bulkhead. The communications hub 105 can be fabricated using any material that supports one or more embodiments described herein (e.g., metals and/or plastics) and can include any number of the antenna ports 110 to satisfy an embodiment of the instant disclosure. The communications hub 110 is preferably externally affixed to the carrier 110, in accordance with yet still other embodiments. The antenna ports 110 can include any fastening mechanism known in the art (e.g., thread, bayonet, braces, blind mate, etc.) and springs for a low ohmic electric contact while sparing the conductive surface, thus allowing very high mating cycles and reducing the insertion force.

Each of the antenna ports 110 is conductively coupled to at least one of the antenna elements 106 and thereby allows its associated handheld transceivers 115 to communicate via the associated antenna element 106. The antenna ports 110 can be any RF connector known in the art that supports one or more embodiments of the instant disclosure (e.g., SMA QMA, BNC, etc.). The handheld transceiver 115 can be a plurality of devices interoperably connected to perform one or more functions, steps, and/or processes of a handheld transceiver known in the art. In several embodiments, the handheld transceiver 115 sends and receives data modulated via one or more communications protocols known in the art. For example, applicable communication protocols can include, but are not limited to, UHF, VHF, Long-Term Evolution ("LTE"), 3G, standards based on GSM/EDGE and/or UMTS/HSPA, Wi-Fi, a IEEE 802.11 standard, GPSR, local area networking protocols, wide area networking protocols, Bluetooth, microwave, similar wireless communications protocols, or a combination of two or more thereof.

In preferred embodiments, the antenna elements 106 are standalone components that are formed (e.g., screen printing, coating, similar application methods) on a substrate (e.g., polyethylene terephthalate and similar materials) using a graphene polymer-based composition ("conductive composition") wherein individual fully exfoliated sheets of graphene ("graphene sheets") are present as a three-dimensional percolated network within the polymer. The resulting antenna elements 106 are affixed to the carrier 101. In some embodiments, the antenna elements 106 are formed (e.g., printed) on a surface of the carrier 101, which acts as the substrate. The graphene sheets are approximately 1 nm or less thick and have a "platey" (e.g., two-dimensional) structure. To be sure, although graphene sheets, graphite, and carbon nanotubes are allotropes of carbon, they are not identical in structure or composition and each exhibits mutually exclusive properties.

The conductive composition preferably includes one or more polymers and fully exfoliated single sheets of graphene that form a three dimensional percolated network within the polymer matrix and have nanoscale separation between the individual graphene sheets. In other embodiments, the antenna elements 115 are printed using other polymer-based conductive inks that contain metals (e.g., silver, copper, gold, nickel, other metals, or a combination of two or more thereof). An increase in resistance results in a decrease in antenna element performance efficiency. As used herein, "antenna efficiency" is defined as the ratio of power delivered to antenna elements versus the power radiated therefrom. Hence, an increase in electrical resistance decreases the amount of power available for radiation, which thereby decreases antenna element performance efficiency.

Not to be limited by theory, in traditional antenna systems (e.g., metal-based antenna systems), insulating separator layers typically have a thickness (t) as defined below in equation [1]:

$$t = \tfrac{1}{2}\lambda;\ \text{where } \lambda \text{ is the intended frequency of the antenna} \qquad \text{Eq. [1]}$$

In several embodiments, contrary to metal-based antenna systems, the antenna elements of the instant application can have a thickness (12) as defined in equation (2):

$$t_2 = \tfrac{1}{4}\lambda;\ \text{where } \lambda \text{ is the intended frequency of the antenna} \qquad \text{Eq. [2]}$$

In certain embodiments, antennas formed using the conductive composition can exhibit primary antenna function on their surface as well as exhibit insulating characteristics correlated to its thickness when in contact with conductive surfaces. Not to be limited by theory, conductive elements formed using the conductive composition can exhibit attenuating permeation that may result in a variable induced charge density as the wave/signal permeates through the antenna. For example, the charge density at any Gaussian plane in the composition is equal to the strength of the electric field after moving any given distance through the material with a particular permittivity.

This phenomenon typically leads to an increased charge density at the point of incidence on the surface and a decrease in charge density as the signal travels through, and is attenuated by, the conductive composition, which can result in the antenna element exhibiting primary antenna function on its surface while providing insulation that is correlated with its thickness when in contact with the conductive surface. On the contrary, traditional metal-based antennas have free electrons to distribute charge and create an affective permittivity of infinity and thereby are unable to achieve attenuating permeation.

Metal-based surfaces (e.g., conductive surfaces) can reflect electromagnetic waves ("EM"); hence, in metal-based antennas the wave typically traverses the correct distance so that the reflected wave's amplitude (denoting signal strength) does not cancel out the original wave's amplitude, which is the case with materials that fail to attenuate EM waves. In stark contrast, conductive elements formed using the conductive composition, EM waves are weakened as they travel through the conductive composition. Hence, as waves reflect off the metal/conductive surface and arrives back to the functioning surface of the conductive element the signal strength or amplitude of the reflected EM wave can be lowered and, at times, out of harmony, fail to cancel out the signal, thus reducing destructive interference.

The antenna element 106 has a reduced visual signature (e.g., about 2 mm-10 mm thick) to address identification and entanglement issues associated with traditional antenna elements (e.g., whip antennas). Here, the antenna element 106 extends no more than 2 mm-10 mm from the surface of the carrier 101 and thereby provides a reduced probability of entanglement with external structures. In other embodiments, the antenna element 115 exhibits a gain greater than 0 dB. In embodiments that include a plurality of antenna elements 115, each antenna element 115 is preferably positioned at various locations on the carrier 101 to achieve an omnidirectional RF radiation pattern that whip antennas known in the art cannot achieve due to RF reflecting and absorbing nature of the human body.

In preferred embodiments, the antenna elements 115 include an EM shielding material positioned in a manner to shields the user from EM radiation emanating from the antenna element 115. FIG. **1*b* depicts a side cut through view of a portion of the carrier 101 that includes an EM shielding material 120 positioned between the antenna element 106 (i.e. the conductive composition) and a ballistic plate 104, which is positioned over a user surface 140 (i.e., user's skin or epithelial layer), in accordance with other embodiments. Hence, the EM shielding material 120 positioned between the antenna element 106 and the user surface 140**.

The EM shielding material 120 and the antenna element 106 are preferably positioned between one or more outer layers 102 (e.g., a front surface 202, a rear surface 502, fabric layers, ballistic layers, anti-microbial layers, coatings, laminations, as well as similar layers and combinations thereof) and one or more inner layers 103 (e.g., a front lining 300, a back lining 600, fabric layers, ballistic layers, anti-microbial layers, coatings, laminations, as well as similar layers and combinations thereof). The outer layers 102 and the inner layers 103 can include, but are not limited to, CORDURA® and/or other material(s) that are similarly durable and resistant to abrasions, tears, and scuffs. The layered material can include, but are not limited to, Kevlar® (160 GSM, 200 GSM and 400 GSM), Twaron®, Dyneema®, Spectra®, Zylon®, and/or similar materials as well as combinations thereof. As such, the carrier 101 can be configured to provide ballistic protection when empty (i.e. without ballistic plate inserts). The carrier 101 also includes an outer surface 125, which is an outermost surface of the carrier 101 and oriented away from the user surface 140, and an inner surface 130, which is another outermost surface of the carrier 101 and is oriented towards the user surface 140.

The EM shielding material 120 is positioned proximate to (i.e. beneath) the antenna element 106 to reflect EM radiation that emanates from the antenna element 106 away from the inner fabric layer 103 and the user surface 140. The EM shielding material 420 includes one or more of a textile, a mesh, a coating, and a foam. Applicable EM shielding material includes, but is not limited to, EM shielding meshes, coatings, textiles, and foams (e.g., quarter inch closed-cell polypropylene foam). For example, the EM shielding material 120 can also be lined with and/or include conductive material, such as aluminum or copper foil, or material coated with (or combined with) graphene, silver, copper, or conductive inks, to provide additional EM isolation and shielding from the user surface 140 to reduce the specific absorption rate of the WCBPS 100. In preferred embodiments, the EM shielding material 120 has a thickness that physically separates antenna elements 106 from user's body to reduce EM interference and improve signal quality.

Figure 2:
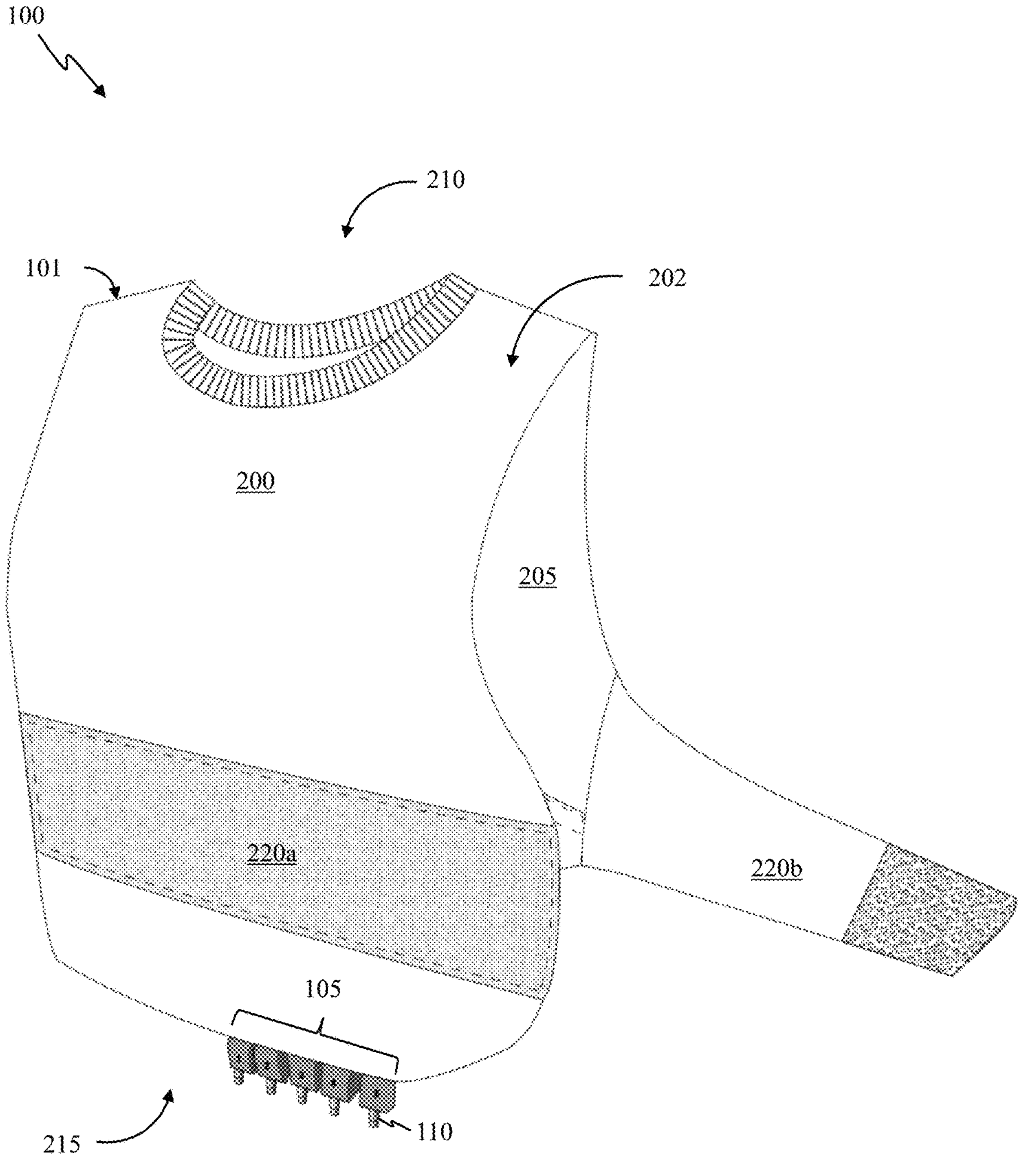
FIG. 2 depicts a perspective view of a ballistic plate carrier ("carrier") in an "open" state, in accordance with certain embodiments.

Although not shown, the carrier 101 can include additional or less layers than are depicted. Even if the antenna element 106 is not present in a component of the carrier 101 the EM shielding layer 120 can provide additional EM shielding and isolation. Lastly, the carrier 101 has an "open state" and a "closed state." FIG. 2 depicts a perspective view of the carrier 101 in an "open" state, in accordance with certain embodiments. Here, the carrier 101 comprises a top end 210, a bottom end 215 positioned opposite the top end 210, a first panel 200 and a second panel 205 pivotably coupled to the first panel at the top end 210. Relative to the user, the first panel 200 is forward facing while the second panel 205 faces the rear. The front panel 200 includes a front surface 202, which is oriented away from the user and to which the antenna elements 106 can be affixed to. To secure the carrier 101 to the user's torso, the first panel 200 and the second panel 205 are laterally and demountably coupled together via a demountable fastener 220, which is multi-component. The demountable fastener can be any fastener that demountably affixed two components together (e.g., buckles, hook-and-loop fasteners, bolt snaps, buttons, snap fasteners, zippers, and other semi-permanent mechanical fasteners), in accordance with an embodiment of the instant disclosure. The demountable fastener 220 is preferably positioned proximate to a bottom end 215.

For example, the demountable fastener **220*a* and the demountable fastener 220*b*, positioned on the first panel 200 and the second panel 205, respectively, are complementing components of a mating system (i.e., they complementarily mate together when joined). In the "open state," the demountable fastener 220 is decoupled (i.e. demountable fastener 220*a* and demountable fastener 220*b* are not decoupled together) and thereby allows the user to don the carrier 101. In the "closed state," the demountable fastener 220 is coupled together and thereby holds the carrier 101 proximate the torso of the user. Although not shown, the carrier 101 can include side panels that may include ballistic plates. The side panels can include one or more components of the demountable fastener 220. At least one of the first panel 200 and the second panel 205 includes the ballistic plate demountably positioned therein. Although the communications hub 105 is depicted as affixed to the first panel 200, the component can alternatively be affixed to the second panel 205**.

Figure 3:
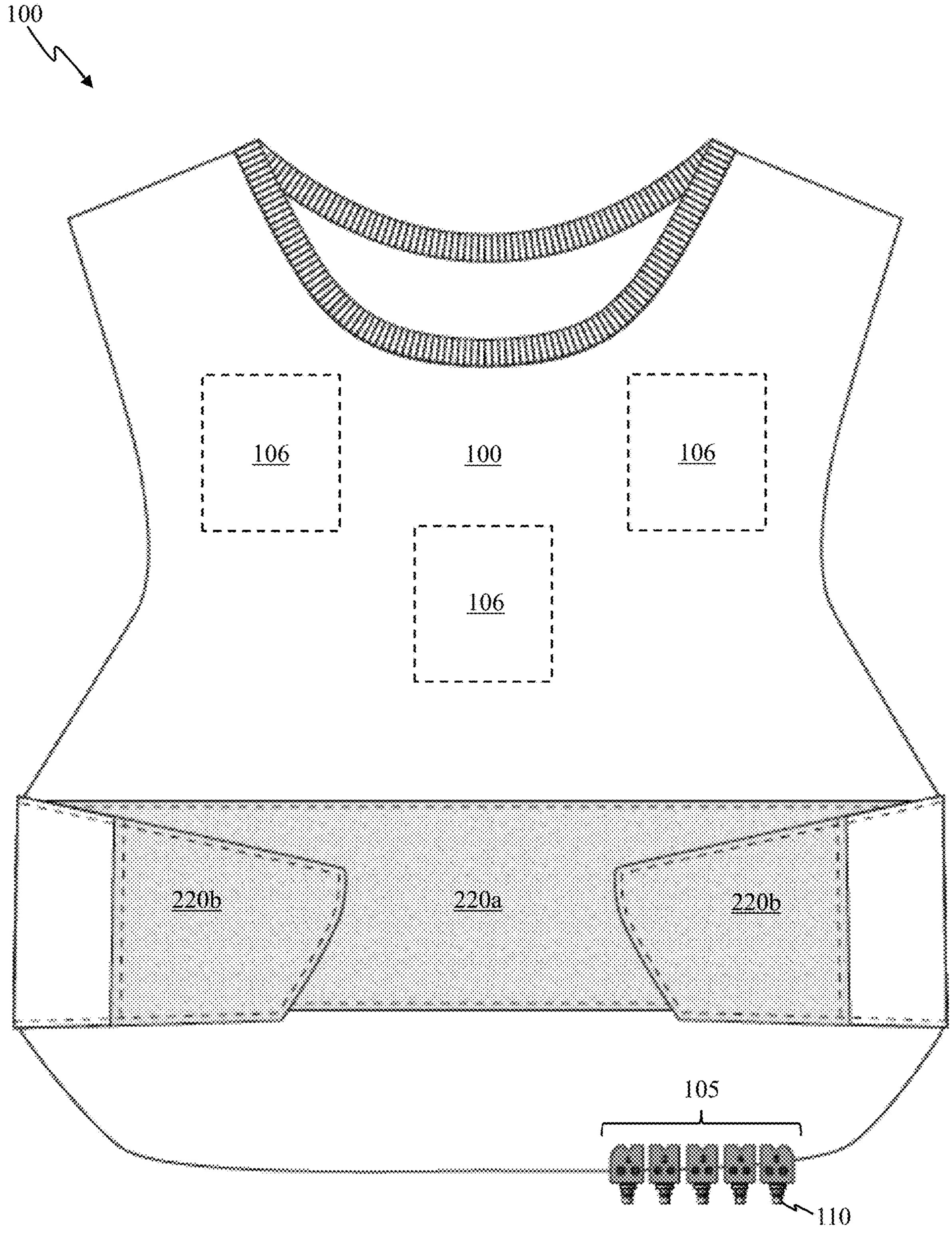
FIG. 3 depicts a front view of the carrier in a "closed" state, in accordance with other embodiments.

At least one of the first panel 200 and the second panel 205 preferably includes EM shielding material positioned under the antenna element 106 and thereby shields the user from EM radiation emanating therefrom. FIG. 3 depicts a front view of the carrier 101 in the "closed" state, in accordance with other embodiments. Here, after the user dons the carrier 101 in the "open state," the user couples the demountable fastener 220*a* and the demountable fastener 220*b* together to thereby hold the carrier 101 proximate to the user's torso.

Figure 4:
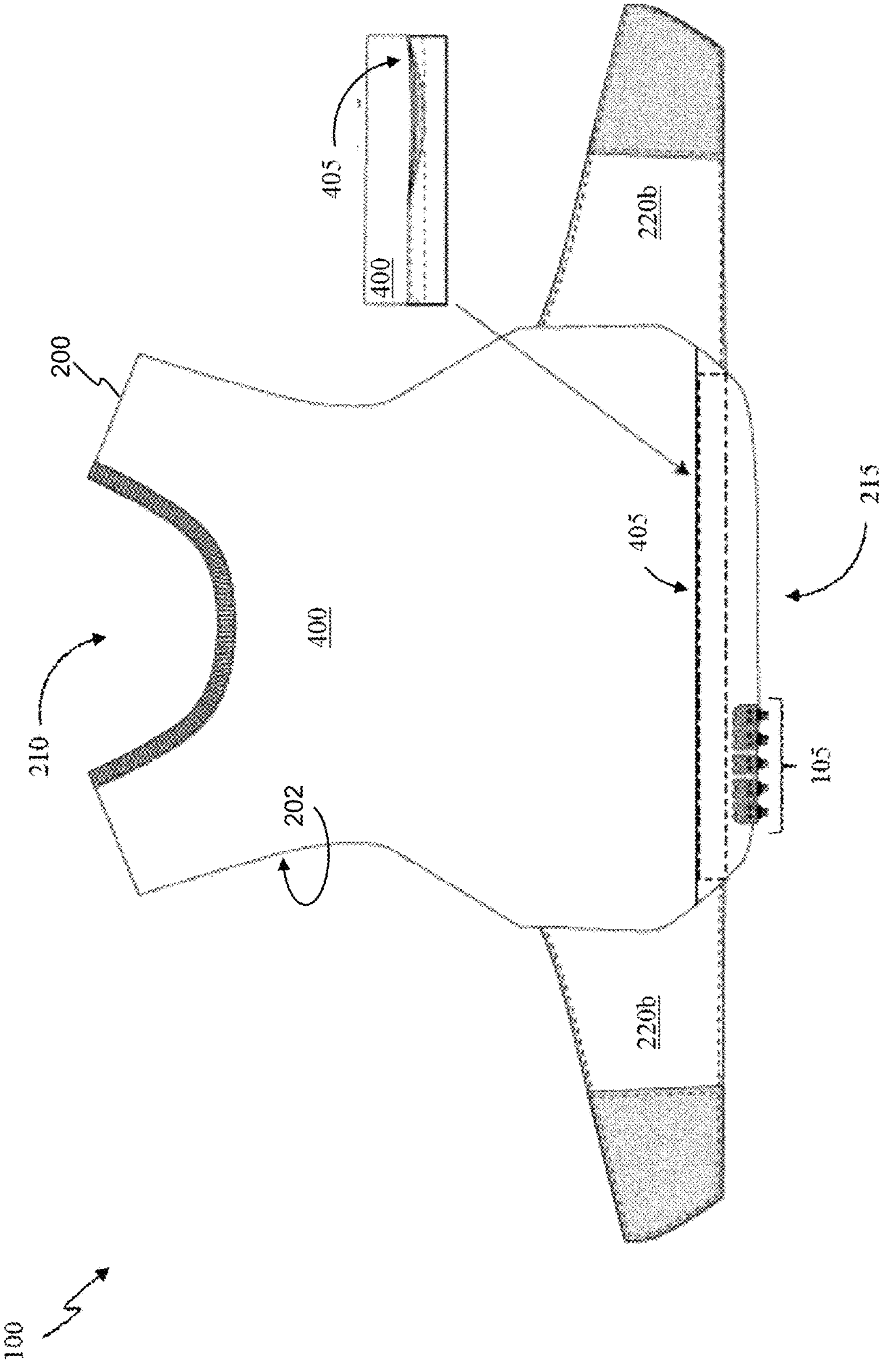
FIG. 4 depicts a lining view of the front panel and the carrier oriented in the "open" state, in accordance with yet still other embodiments.

FIG. 4 depicts a lining view of the front panel 200 and the carrier 101 in the "open" state, in accordance with yet still other embodiments. The first panel 200 also includes the front lining 400, which faces the user. The front surface 202 and the front lining 400 are peripherally bound together to form an enclosure that can be accessed via an opening 405 to, for example, insert ballistic plates. The opening is preferably held closed via demountable fasteners. In some aspects, the front lining 400 can have EM shielding properties.

Figure 5:
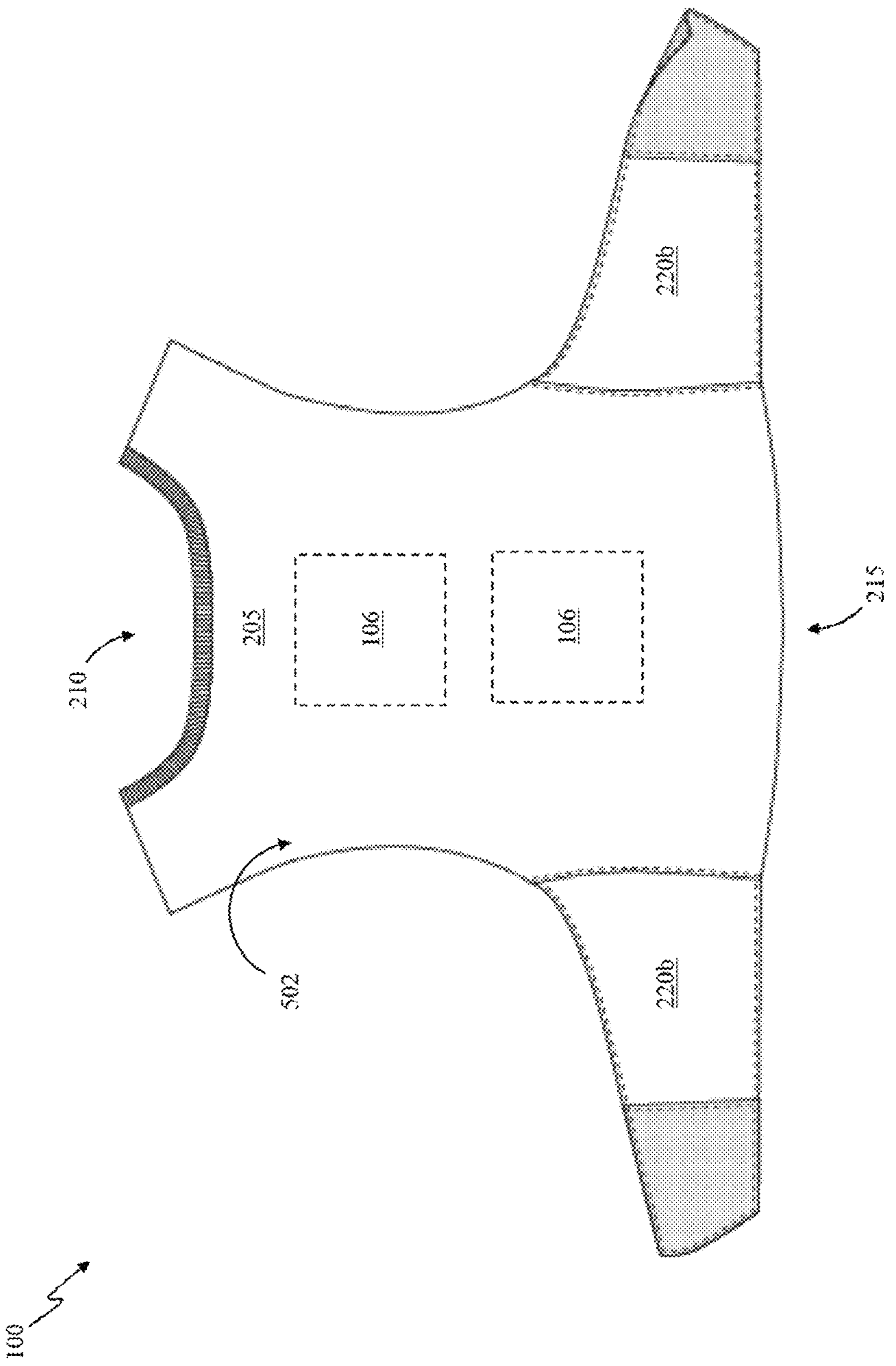
FIG. 5 depicts a back view of the carrier oriented in the "open" state, in accordance with some embodiments.
Figure 6:
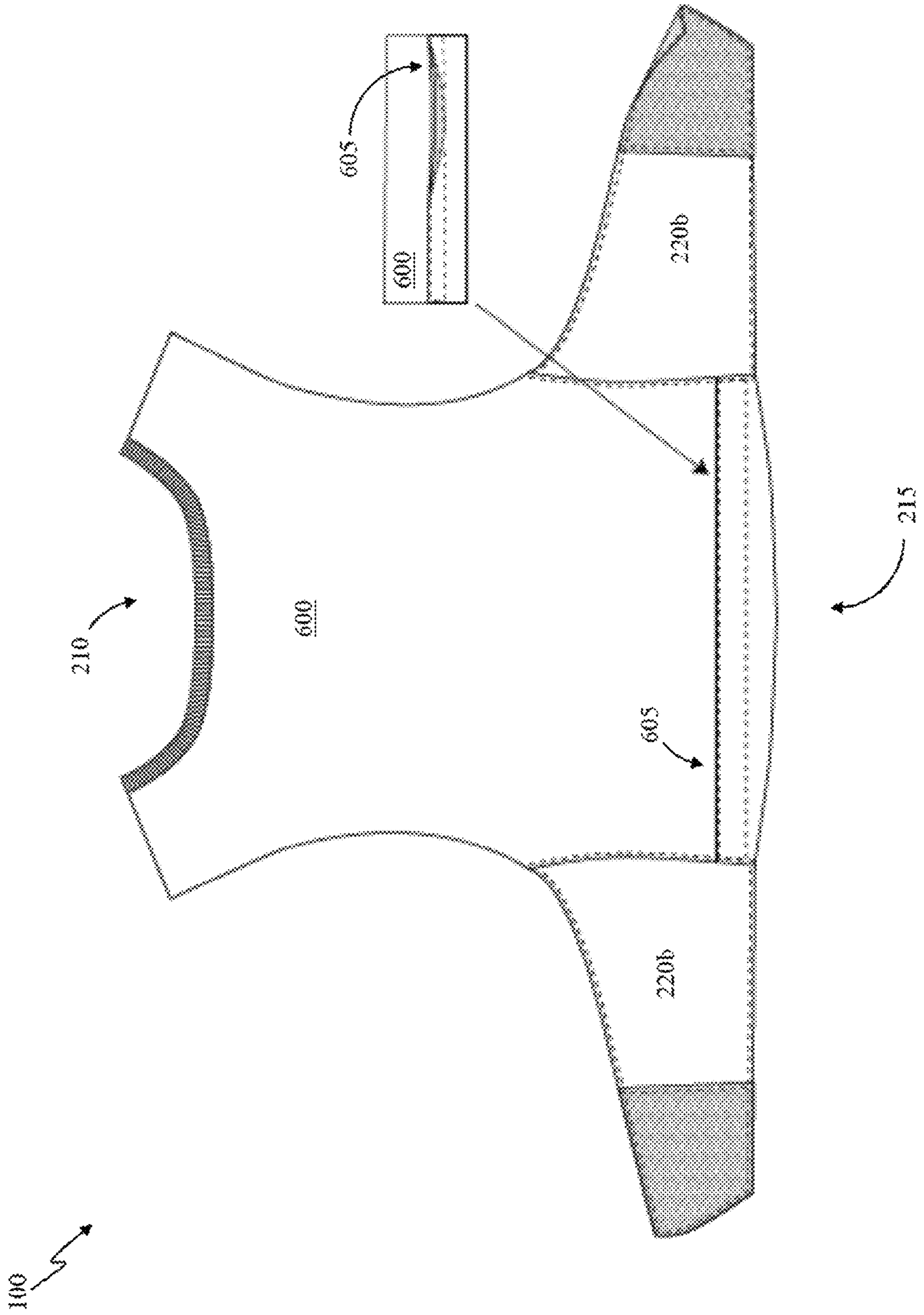
FIG. 6 depicts a lining view of the back panel and the carrier oriented in the "open" state, in accordance with some embodiments.

FIG. 5 depicts a rear view of the carrier 101 oriented in the "open" state, in accordance with some embodiments. The second panel 205 includes a rear surface 502, which is oriented away from the user, and a back lining 600 that is oriented towards the user. As reflected in FIG. 6. The rear surface 502 and the back lining 600 are peripherally bound together to form an enclosure that can be accessed via an opening 605 to, for example, insert ballistic plates.

Based on the foregoing, various embodiments have been disclosed in accordance with the instant disclosure. However, numerous modifications and substitutions can be made without deviating from the scope of the instant disclosure. Therefore, the instant disclosure conveys by way of example and not limitation.

As various modifications could be made in the constructions and methods herein described and illustrated without departing from the scope of the instant disclosure, it is intended that all matter contained in the foregoing description or shown in the accompanying drawings shall be interpreted as illustrative rather than limiting. Thus the breadth and scope of the instant disclosure should not be limited by any of the above-described exemplary embodiments, but should be defined only in accordance with the following claims appended hereto and their equivalents.

The invention claimed is:

1. A wearable communications and ballistics protection system comprising:
- a carrier;
- a communications hub;
- an antenna element;
- wherein
  - the communications hub
    - is affixed to the carrier;
    - comprises an antenna port;
  - the antenna element is affixed to the carrier;
  - the antenna port
    - is conductively coupled to the antenna element;
    - demountably and conductively couples to a portable radio;
  - the carrier
    - demountably receives a ballistic plate; and
    - configured to be worn on the torso of a user and provide ballistic protection thereto.

2. The wearable communications and ballistics protection system of claim 1, wherein
- the antenna element comprises a conductive composition;
- the conductive composition comprises:
  - a polymer;
  - fully exfoliated single sheets of graphene that are present as a three-dimensional percolated network within the polymer.

3. The wearable communications and ballistics protection system of claim 1, wherein
- the carrier comprises:
  - a first panel;
  - a second panel pivotably coupled to the first panel at a top end;
- the first panel and the second panel are laterally and demountably coupled together via a demountable fastener; and
- the demountable fastener positioned proximate to a bottom end.

4. The wearable communications and ballistics protection system of claim 3, wherein
- at least one of the first panel and the second panel comprises the ballistic plate demountably positioned therein.

5. The wearable communications and ballistics protection system of claim 3, wherein
- the communications hub is affixed to the first panel or the second panel.

6. The wearable communications and ballistics protection system of claim 1, wherein
- the antenna element comprises an EM shielding material positioned below the conductive composition and thereby shields the user from EM radiation emanating from the antenna element.

7. The wearable communications and ballistics protection system of claim 4, wherein
- at least one of the first panel and the second panel comprises an EM shielding material positioned under the antenna element and thereby shield the user from EM radiation emanating from the antenna element.

8. The wearable communications and ballistics protection system of claim 3, wherein
- the carrier comprises a open state and a closed state;
- in the open state, the demountable fastener is decoupled and thereby allows the user to don the carrier; and
- in the closed state, the demountable fastener is coupled together and thereby holds the carrier proximate the torso of the user.

9. The wearable communications and ballistics protection system of claim 1, wherein
- the antenna element comprises a thickness of 3-10 mm.

10. A wearable communications and ballistics protection system comprising:
- a carrier;
- a communications hub;
- an antenna element;
- wherein
  - the communications hub
    - is affixed to the carrier;
    - comprises an antenna port;

the antenna element is affixed to the carrier;
the antenna port
is conductively coupled to the antenna element;
demountably and conductively couples to a portable radio;
the carrier
demountably receives a ballistic plate;
configured to be worn on the torso of a user and provide ballistic protection thereto;
the antenna element comprises a conductive composition;
the conductive composition comprises:
fully exfoliated single sheets of graphene;
a polymer; and
the fully exfoliated sheets of graphene form a three-dimensional percolated network within the polymer.

11. The wearable communications and ballistics protection system of claim 10, wherein
the carrier comprises:
a first panel;
a second panel pivotably coupled to the first panel at an end; and
the first panel and the second panel are laterally and demountably coupled together via a demountable fastener.

12. The wearable communications and ballistics protection system of claim 11, wherein
at least one of the first panel and the second panel demountably receives the ballistic plate.

13. The wearable communications and ballistics protection system of claim 11, wherein
the communications hub is affixed to the first panel or the second panel.

14. The wearable communications and ballistics protection system of claim 10, wherein
the antenna element comprises an EM shielding material positioned below the conductive composition and thereby shield the user from EM radiation emanating from the antenna element.

15. The wearable communications and ballistics protection system of claim 12, wherein
at least one of the first panel or the second panel comprises an EM shielding material positioned under the antenna element and thereby shield the user from EM radiation emanating from the antenna element.

16. The wearable communications and ballistics protection system of claim 11, wherein
the carrier comprises a open state and a closed state;
in the open state, the demountable fastener is decoupled and thereby allows the user to don the carrier; and
in the closed state, the demountable fastener is coupled together and thereby holds the carrier proximate the torso of the user.

17. The wearable communications and ballistics protection systems of claim 10, wherein
the antenna element comprises a thickness of 3-10 mm.

18. A wearable communications and ballistics protection system comprising:
a carrier;
a communications hub;
antenna elements;
wherein
the carrier
is worn on the torso of a user and provides ballistic protection thereto;
comprises:
a first panel;
a second panel pivotably coupled to the first panel at a top end;
the first panel and the second panel are laterally and demountably coupled together via a demountable fastener;
each of the first panel and the second panel
comprises a ballistic plate demountably positioned therein;
comprise at least one of the antenna elements affixed thereto;
the communications hub
is externally affixed to the first panel or the second panel;
comprises antenna ports;
each antenna port
is conductively coupled to at least one of the antenna elements;
demountably and conductively couples to a portable radio;
the antenna element comprises a conductive composition;
the conductive composition comprises:
a polymer;
fully exfoliated single sheets of graphene that are present as a three-dimensional percolated network within the polymer.

19. The wearable communications and ballistics protection system of claim 18, wherein at least one of
the antenna element, the first panel, and the second panel comprise an EM shielding material positioned between the conductive composition and the user to shield the user from EM radiation emanating therefrom.

20. The wearable communications and ballistics protection system of claim 19, wherein
the carrier comprises a open state and a closed state;
in the open state, the demountable fastener is decoupled and thereby allows the user to don the carrier; and
in the closed state, the demountable fastener is coupled together and thereby holds the carrier proximate the torso of the user.

* * * * *